(12) United States Patent
Onodera

(10) Patent No.: US 9,319,429 B2
(45) Date of Patent: Apr. 19, 2016

(54) NETWORK QUARANTINE SYSTEM, NETWORK QUARANTINE METHOD AND PROGRAM THEREFOR

(75) Inventor: Hisato Onodera, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/129,750

(22) PCT Filed: Jul. 9, 2012

(86) PCT No.: PCT/JP2012/067437
§ 371 (c)(1),
(2), (4) Date: Dec. 27, 2013

(87) PCT Pub. No.: WO2013/008770
PCT Pub. Date: Jan. 17, 2013

(65) Prior Publication Data
US 2014/0143853 A1 May 22, 2014

(30) Foreign Application Priority Data
Jul. 11, 2011 (JP) ................................. 2011-152469

(51) Int. Cl.
*G06F 9/00* (2006.01)
*H04L 29/06* (2006.01)
*H04L 12/46* (2006.01)

(52) U.S. Cl.
CPC ............ *H04L 63/20* (2013.01); *H04L 12/4645* (2013.01); *H04L 63/10* (2013.01)

(58) Field of Classification Search
None
See application file for complete search history.

(56) References Cited

U.S. PATENT DOCUMENTS 8,955,107 B2 * 2/2015 Eyada .............................. 726/22
2006/0101409 A1 5/2006 Bemmel

FOREIGN PATENT DOCUMENTS

| JP | 11-289347 A | 10/1999 |
|----|-------------|---------|
| JP | 2004-328559 A | 11/2004 |
| JP | 2006-72682 A | 3/2006 |
| JP | 2006-121704 A | 5/2006 |
| JP | 2007-199980 A | 8/2007 |
| JP | 2010-219803 A | 9/2010 |
| JP | 2010-246061 A | 10/2010 |

OTHER PUBLICATIONS

International Search Report for PCT Application No. PCT/JP2012/067437, mailed on Sep. 4, 2012.
Japanese Office Action for JP Application No. 2013-523939 mailed on Dec. 2, 2014 with English Translation.

\* cited by examiner

*Primary Examiner* — Brandon Hoffman

(57) ABSTRACT

To isolate a terminal from a network immediately after a quarantine agent is uninstalled therefrom, a policy readout unit reads out a policy from a policy database and a policy check unit determines whether or not a terminal satisfies the policy that was read out. If it is determined that the terminal satisfies the read out policy, a quarantine server control unit instructs a bridge to destroy a packet with no VLAN tag among the packets sent from the terminal while controlling a quarantine agent to send a packet with a VLAN tag when sending the packet from the terminal.

9 Claims, 13 Drawing Sheets

FIG. 3A

| QUARANTINE NETWORK | OPERATION NETWORK |
|---|---|
| ID 10 | ID 20 |

FIG. 3B

| PORT | MAC ADDRESS | NETWORK TYPE | LIFE TIME |
|---|---|---|---|
| 3 | 01-02-03-04-05-0A | QUARANTINE NETWORK | — |
| 4 | 01-02-03-04-05-0B | OPERATION NETWORK | 2010/12/31 23:59:30 |

FIG. 3C

・OS SECURITY PATCH
KB982519, KB982632,・・・

・ANTIVIRUS PATTERN FILE
VERSION 5670 OR HIGHER

FIG. 3D

| NETWORK TYPE | VLAN ID |
|---|---|
| QUARANTINE NETWORK | ID 20 |

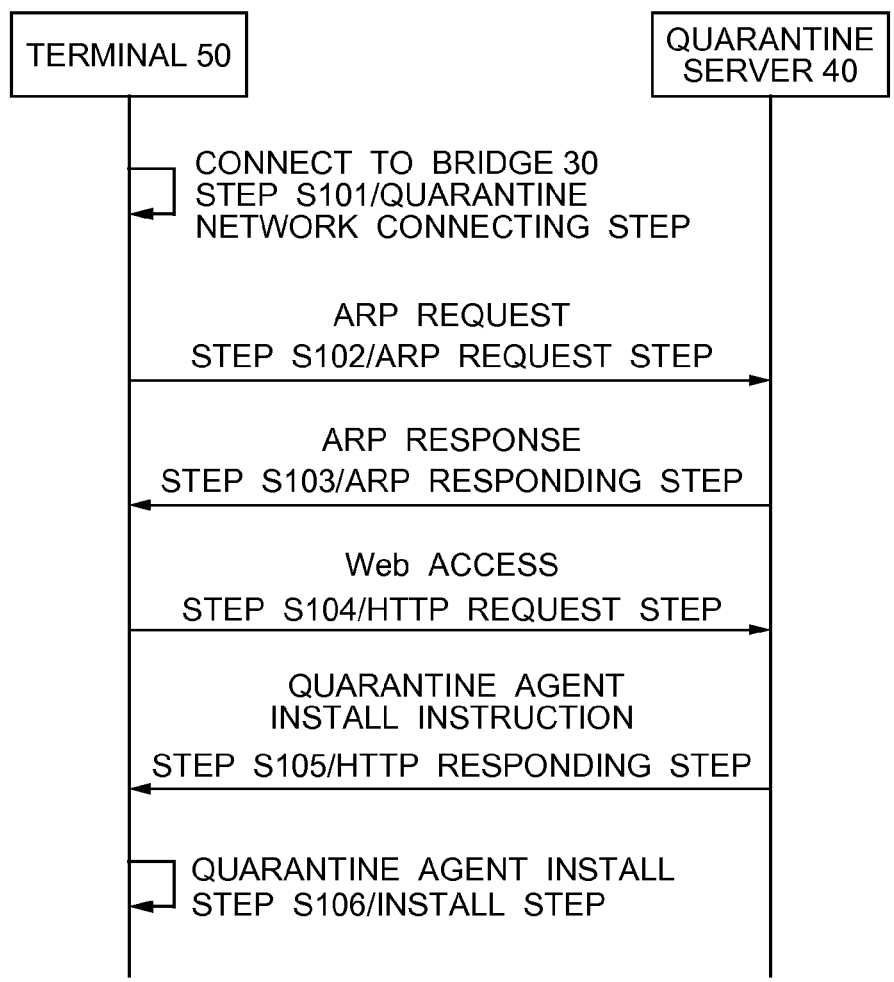

FIG. 6A

| PORT | VLAN ID | VLAN TAG |
|---|---|---|
| 1 | ID 20 | NO |
| 2 | ID 10, ID 20 | YES |
| 3 | ID 10 | NO |

FIG. 6B

| PORT | VLAN ID | VLAN TAG |
|---|---|---|
| 1 | ID 20 | NO |
| 2 | ID 10, ID 20 | YES |
| 3 | ID 20 | YES |

NETWORK QUARANTINE SYSTEM, NETWORK QUARANTINE METHOD AND PROGRAM THEREFOR

This application is a National Stage Entry of PCT/JP2012/067437 filed on Jul. 9, 2012, which claims priority from Japanese Patent Application 2011-152469 filed on Jul. 11, 2011, the contents of all which are incorporated herein by reference, in their entirety.

TECHNICAL FIELD

The present invention relates to a network quarantine system and, more specifically, to a network quarantine system which checks the policy of terminals and isolates the terminal that does not satisfy the policy from an operation network that is constituted with information processing devices that satisfy the policy.

BACKGROUND ART

Recently, quarantine systems have come to be employed for preventing illegal accesses made to operation networks of business corporations and the like where the security is ensured. The quarantine system is a system which, when a terminal is connected anew to a network, isolates the terminal to a quarantine network provided for checking the policy separately from the operation network, judges whether or not the terminal satisfies the policy that is the basis for the security for being connected to the operation network, and allows the terminal to connect to the operation network when judged that it satisfies the policy as a result of the judgment.

For that, there are Patent Documents 1 to 3 as the specifically known technical documents related to the above-described technical field.

The quarantine system disclosed in Patent Document 1 is constituted with a gate (Gate) device, agent software, an agent control server, and a control device. In the quarantine system, when an agent software unemployed terminal is connected to the Gate device, the Gate device first urges the terminal to employ the agent. When the agent is not employed, the Gate device denies connection to an operation network that is an in-company network. In the meantime, even in a case of an agent software employed terminal, connection to the in-company network is also denied when the management device judges that the terminal is unsafe. That is, Patent Document 1 discloses a technical content for preventing connection of the agent software unemployed terminal to the in-company network.

Further, Patent Document 2 discloses a technical content with which the quarantine agent employed to the client computer acquires the policy regularly from the quarantine server to suppress delay between a point where the policy is updated by the quarantine server and a point where the update is reflected in the quarantine agent of the client computer.

Further, Patent Document 3 discloses a technical content with which, when a communication apparatus is connected to a network, it is connected to a check-in network, whether or not the communication apparatus satisfies the connection condition for connecting to a main network is judged in the check-in network, and it is allowed to connect to the main network from the check-in network when judged that the connection condition is satisfied.

As described, with the conventional quarantine system, the terminal is isolated from the operation network until the terminal policy check is completed, and connection of the terminal to the operation network is allowed only when the terminal is judged as safe as a result of the policy check. This increases the security of the operation network.

Patent Document 1: Japanese Unexamined Patent Publication 2006-72682
Patent Document 2: Japanese Unexamined Patent Publication 2010-219803
Patent Document 3: Japanese Unexamined Patent Publication 2007-199980

However, with the known techniques disclosed in Patent Document 1 or 3, when the quarantine agent is invalidated (uninstalled) unlawfully after connection to the operation network is permitted, the terminal whose quarantine agent is uninstalled is kept in a state of being connected to the operation network.

Further, like the known technique disclosed in Patent Document 2, even with the use of the method with which communication is done regularly between the quarantine agent and the quarantine server for checking the install state of the quarantine agent, the terminal whose quarantine agent is uninstalled is also kept in a state of being connected to the operation network during the time after the quarantine agent is uninstalled from the terminal until a next check for existence of the agent is done.

The object of the present invention is to improve the inconveniences of the above-described related techniques and to provide a network quarantine system capable of ensuring the security of the operation network through isolating the terminal from the operation network immediately without keeping the terminal in a state of being connected to the operation network even when the terminal is judged to satisfy the policy by the quarantine agent and connected to the operation network and then the quarantine agent is uninstalled unlawfully by an operator.

DISCLOSURE OF THE INVENTION

In order to achieve the foregoing object, the network quarantine system according to the present invention is a network quarantine system which includes:

a quarantine agent mounted to a terminal having a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, wherein: the quarantine server includes a quarantine server control unit which functions when judged by the quarantine agent that the normal operation implementation unit of the terminal satisfies the policy to transmit a connection permission notification containing a connection identifier for the operation network to the terminal and gives an instruction to the relay device to destroy information to which the connection identifier is not added as unrelated information; and the quarantine agent of the terminal includes a VLAN tag operation unit which gives an instruction regarding an adding action of the normal operation implementation unit of the terminal to add the connection identifier every time when transmitting transmission information based on the connection permission notification transmitted from the quarantine server.

Further, the network quarantine method according to the present invention is used in a network quarantine system which includes: a quarantine agent mounted to a terminal having a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, wherein: when judged by the quarantine agent that a normal operation implementation unit of the terminal satisfies the policy, a quarantine server control unit gives an instruction to the relay device to destroy information to which the connection identifier is not added as unrelated information; the quarantine server control unit transmits a connection permission notification containing a connection identifier for the operation network to the terminal; and a VLAN tag operation unit gives an instruction regarding an adding action of the normal operation implementation unit of the terminal to add the connection identifier every time when transmitting transmission information based on the connection permission notification transmitted from the quarantine server.

The network quarantine program according to the present invention is used in a network quarantine system which includes: a quarantine agent mounted to a terminal having a normal operation implementation unit that performs operation processing by using an operation network, which judges whether or not the normal operation implementation unit satisfies a policy that is a security basis restricted in advance in the operation network; a relay device connected in between the terminal and the operation network, which allows the terminal to connect to the operation network based on a result of judgment when the quarantine agent judges that the terminal satisfies the policy; and a quarantine server which controls actions of the relay device, the program causing a computer provided in advance to the quarantine server to execute: a relay device instruction function which, when judged by the quarantine agent that the normal operation implementation unit of the terminal satisfies the policy, transmits a connection permission notification containing a connection identifier for the operation network to the terminal and gives an instruction to the relay device to destroy information to which the connection identifier is not added as unrelated information.

It is possible with the present invention to improve the inconveniences of the above-described related techniques and to provide a network quarantine system, a quarantine method, and a program thereof, which are capable of immediately destroying the information transmitted from the terminal by cooperative actions of the quarantine server and the delay device and immediately blocking the terminal from the operation network without keeping the terminal in a state of being connected to the operation network even when the terminal is judged to satisfy the policy by the quarantine agent and connected to the operation network and then the quarantine agent is uninstalled unlawfully.

BRIEF DESCRIPTION OF THE DRAWINGS

FIGS. 3A-3D present charts showing examples of setting values of each database (DB) of the network quarantine system disclosed in FIG. 1, in which 3A is a chart showing the content of VLAN setting DB44, 3B is a chart showing the content of terminal information DB46, 3C is a chart showing the content of policy DB47, and 3D is a chart showing the content of VLAN tag setting DB68;

FIG. 4 is a sequence chart showing actions of a terminal 50 and a quarantine server 40 when the terminal 50 is connected to a bridge 30 disclosed in FIG. 1;

FIGS. 6A and 6B present charts of setting values of the bridge 30 disclosed in FIG. 1, in which 6A is a chart of a case where the terminal 50 is connected anew to a port number "3", and 6B is a chart of a case where the terminal 50 is in a state capable of being connected to the operation network;

Figure 1:
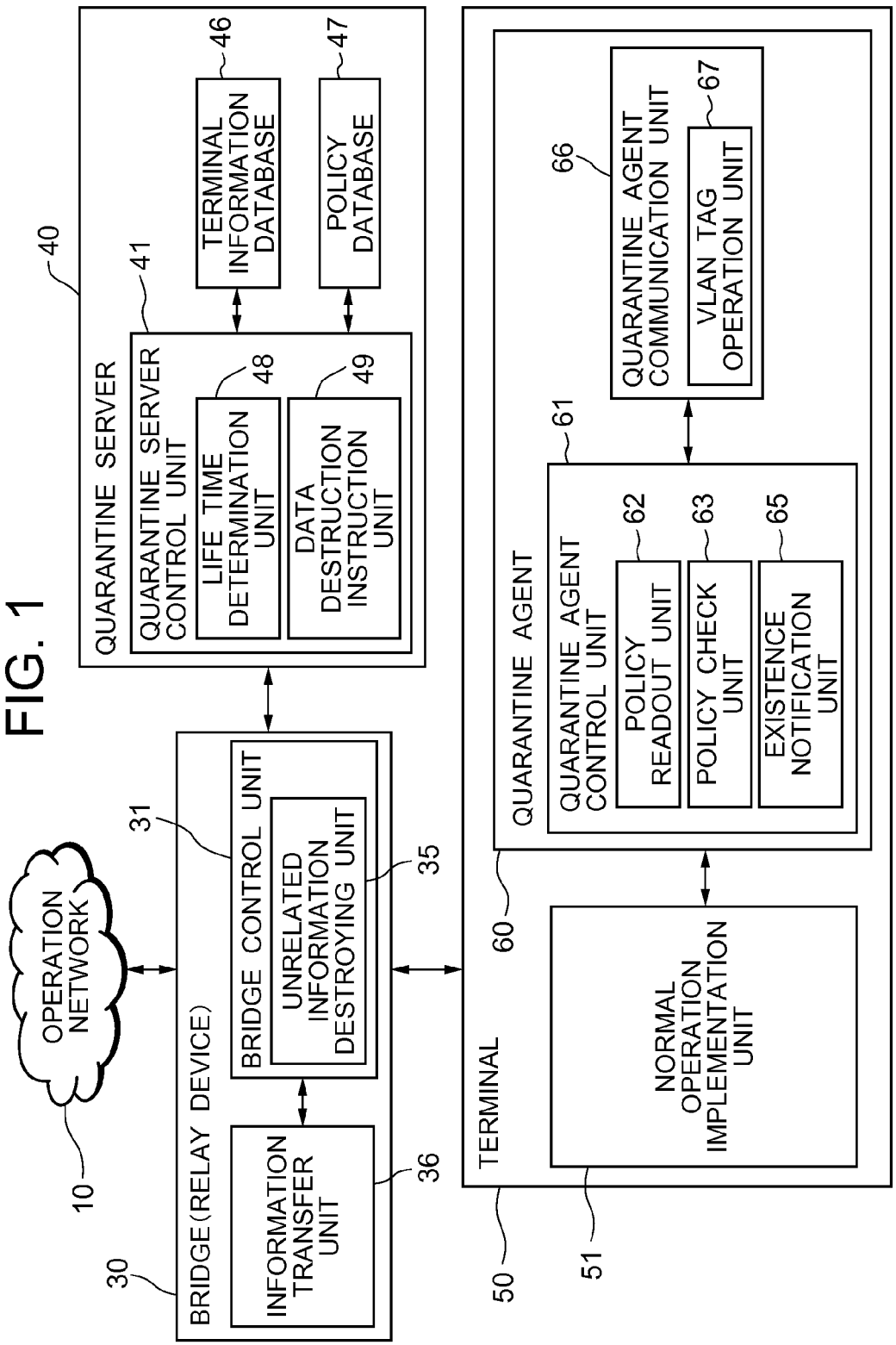
FIG. 1 is a block diagram showing an exemplary embodiment of a network quarantine system according to the present invention.

MODES FOR EMBODYING THE PRESENT INVENTION (Exemplary Embodiment)

Hereinafter, an exemplary embodiment of a network quarantine system according to the present invention will be described by referring to FIG. 1 to FIG. 13.

The basic contents of the network quarantine system according to the present invention will be described first, and specific contents will be described thereafter.

The network quarantine system according to the exemplary embodiment includes: a quarantine agent 60 which is mounted to a terminal 50 having a normal operation implementation unit 51 that executes operation processing by using an operation network 10 and judges whether or not the normal operation implementation unit 51 satisfies a policy that is a security basis regulated in advance in the operation network 10; a relay device (bridge) 30 connected between the terminal 50 and the operation network 10 and allows the terminal 50 to connect to the operation network 10 based on a judgment result when the quarantine agent 60 judges that the terminal 50 satisfies the policy; and a quarantine server 40 which controls actions of the bridge 30.

The above-described quarantine server 40 includes a quarantine server control unit 41 which functions when the normal operation implementation unit 51 of the terminal 50 is judged to satisfy the policy by the quarantine agent 60 to transmit a connection permission notification containing a connection identifier for the operation network 10 to the terminal 50 and gives an instruction to the bridge 30 to destroy information to which the connection identifier is not added as unrelated information. The quarantine agent 60 of the terminal 50 includes a VLAN tag operation unit 67 which gives an instruction regarding adding actions of the normal operation implementation unit 51 of the terminal 50 to add the connection identifier every time the transmission information is transmitted based on the connection permission notification transmitted from the quarantine server 40.

Thereby, when the quarantine agent 60 is unlawfully uninstalled after the terminal 50 is judged to satisfy the policy by the quarantine agent 60 and the terminal 50 is connected to the operation network 10, it is possible to immediately destroy the information transmitted from the terminal 50 in a cooperate action of the quarantine server 40 and the bridge 30 and to immediately block the terminal 50 from the operation network 10 without keeping the terminal 50 being connected to the operation network 10.

The above-described quarantine server control unit 41 has a function of accepting an input of the policy from outside in advance, and a policy database 47 for storing the externally inputted policy is provided along with the quarantine server control unit 41.

Further, the quarantine agent 60 of the terminal 50 described above reads out the policy from the database 47 when judging the policy, and a policy check unit 63 provided in advance to the quarantine agent 60 judges whether or not the normal operation implementation unit 51 satisfies the read out policy.

Further, the quarantine agent 60 of the terminal 50 described above includes an existence notification unit 65 which transmits, to the quarantine server 40, an existence notification showing that the quarantine agent 60 exists in the terminal 50 when the policy check unit 63 judges that the policy is satisfied.

Further, the above-described quarantine server 40 includes a terminal information database 46 which stores the time acquired by adding connection permitted time set in advance to the date/time at which the existence notification transmitted from the existence notification unit 65 of the terminal 50 is received most recently as a life of the terminal 50.

Further, the above-described quarantine server control unit 41 includes: a life time determination unit 48 which judges whether or not it has reached a life time; and a data destroy instruction unit 49 which gives an instruction to destroy the transmission information transmitted from the terminal 50 as the unrelated information to the bridge 30 when it is judged by the life time determination unit 48 that it has reached the connection limit.

Further, the above-described bridge 30 includes an unrelated information destroying unit 35 which destroys the transmission information transmitted from the terminal 50 as the unrelated information upon receiving the instruction from the data destruction instruction unit 49.

Thereby, when the time set in advance has passed from the date/time at which the existence notification is received most recently from the terminal 50, the quarantine server control unit 41 can judge that the quarantine agent 60 is uninstalled from the terminal 50.

Subsequently, the specific contents will be described.

First, in the network quarantine system according to the exemplary embodiment, as described above, the quarantine server 40 and the terminal 50 are connected to the bridge 30 that is the relay device. The bridge 30 is connected to the operation network 10 to which an information processing device satisfying the policy that is the security basis set in advance is connected. Further, the bridge 30 is connected to a router used for connecting to the Internet in a form, not shown, via the above-described operation network 10. This router is connected to the Internet.

The above-described bridge 30 sets the connection target of the terminal connected to the bridge 30 to either the operation network constituted with the information processing devices that satisfy the policy or the quarantine network which isolates the terminal not satisfying the policy based on the setting inputted from outside.

The terminal whose security is not ensured such as the terminal in which the quarantine agent 60 is not installed or the terminals not satisfying the security policy, for example, is connected to the above-described quarantine network. The quarantine network is a network in which the router and the security are ensured, which is isolated by a virtual network (VLAN) that cannot communicate with the terminal connected to the operation network.

Note here that the above-described VLAN is a virtual network constituted with the bridge 30. The bridge 30 according to the exemplary embodiment includes a plurality of connection ports to which different port numbers from each other are given, and has a function capable of designating the VLAN of the connection target by each of the connection port numbers based on the input from outside.

For example, the terminal 50 in which the quarantine agent 60 is not installed and the quarantine server 40 belong to the quarantine network (VLAN ID: 10). Further, the terminal 50 which includes the quarantine agent 60 installed therein but does not satisfy the security policy belongs to the quarantine network (VLAN ID: 10).

The quarantine agent 60 is installed in the above-described operation network, and it is the operation network that is required to ensure such safety that the terminal 50 satisfying the security policy is connected thereto. The quarantine gent 60 is installed in the operation network (VLAN ID: 20), and the terminal 50 satisfying the security policy, the quarantine server 40, and the router belong to the operation network.

Thereby, the quarantine network (VLAN ID: 10) and the operation network (VLAN ID: 20) cannot be connected to each other by the relay setting of the bridge 30. Thus, when the terminal 50 satisfies the policy, it can be connected only to the operation network (VLAN ID: 20). When the terminal 50 does not satisfy the policy, it can be isolated to the quarantine network (VLAN ID: 10).

Figure 2:
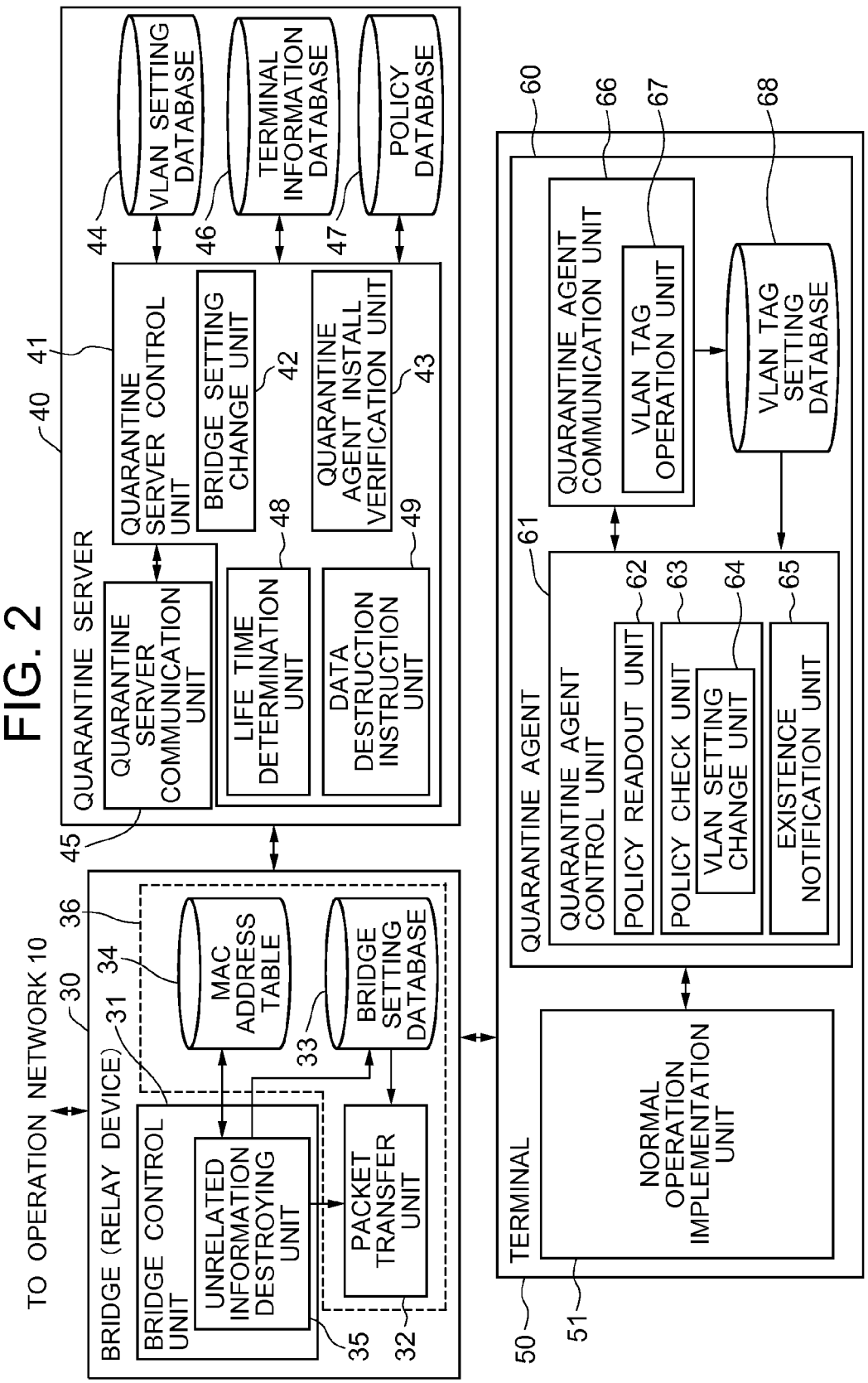
FIG. 2 is a chart showing contents of each block of the network quarantine system disclosed in FIG. 1.

Next, the feature characteristics of the bridge 30, the quarantine server 40, and the quarantine agent 60, which play the main roles in the exemplary embodiment, will be described by referring to FIG. 2.

First, the terminal 50 includes: the normal operation implementation unit 51 which connects to the operation network and executes operation processing; and the quarantine agent 60 which judges whether or not the normal operation implementation unit 51 satisfies the policy.

Further, the quarantine server 40 includes: a quarantine server control unit 41 which performs action controls of each structure of the quarantine server and action controls of the entire quarantine server; a VLAN setting DB44 having the information regarding VLAN setting; a quarantine communication server 45 which performs communication controls of the quarantine server 40; a terminal information DB46 which stores the information of the terminal 50 connected to the bridge 30; and a policy DB47 which stores the security policy information that needs to be satisfied to be connected to the operation network.

In the above-described VLAN setting DB 44, the corresponding relation between the network types and the VLAN ID (identifiers) is stored. FIG. 3A shows the data structure of the VLAN setting DB. In FIG. 3A, "quarantine network" and "operation network" show VLAN IDs treated as the quarantine network and the operation network, respectively.

Further, the quarantine server communication unit 45 not only performs communication controls of the quarantine server 40 but also performs actions for returning an ARP response for a request of connection-target specifying information (ARP) flown in the quarantine network even when the IP address as the address information on the network is not for the quarantine server 40.

Thereby, the quarantine server 40 can receive an information transmission request (HTTP request) transmitted from the terminal 50 to the relay device, and transmit a notification to the terminal 50 to encourage installation of the quarantine agent 60 or a notification for encouraging to conform to the policy.

In the above-described terminal information DB 46, the information of the terminals connected to the bridge 30 is stored. FIG. 3B shows the data structure thereof. In FIG. 3B, "port" shows the number of the physical port of the bridged 30. "MAC address (inherent identifier of communication apparatus)" shows the MAC address of the terminal 50 connected to each physical port of the bridge 30. "Network type" shows the type of the VLAN setting of each physical port of the bridge 30. "Life time" shows the limit until which the terminal 50 connected to the operation network can be connected to the operation network. Note here that when "-" is shown in the life time, it means that there is no value.

Further, the above-described quarantine server control unit 41 includes: a life time determination unit 48 which judges whether or not it has reached the life time; and a data destruction instruction unit 49 which gives an instruction to the relay device 30 to destroy the information transmitted from the terminal 50 as the unrelated information when judged by the life time judging unit 48 that it has reached the connection limit.

Further, the relay device 30 includes an unrelated information destroying unit 35 which destroys the transmission information transmitted from the terminal 50 as the unrelated information upon receiving an instruction from the data destruction instruction unit 49.

Further, in the policy DB 47, registered are a list of operating system (OS) security patches required to be employed to the terminal 50 for being connected to the operation network, antivirus pattern file version conditions, and the like as shown in FIG. 3C, for example.

Note here that it is also possible to store a newly defined policy to the policy DB 47 based on the input from outside through providing the above-described quarantine server control unit 41 with a function for accepting input of the policy from outside and storing it to the policy DB 47.

The above-described quarantine server control unit 41 includes a bridge setting change unit 42 and a quarantine agent install verification unit 43 as the feature functional blocks. The bridge setting change unit 42 controls the content of the VLAN setting DB 44 and changes handling of the VLAN to which the terminal 50 belongs and the VLAN tag of the port to which the terminal 50 is connected through changing the setting of the bridge 30 based on the content of the VLAN setting DB 44.

The above-described quarantine agent install checking unit 43 checks whether or not the quarantine agent 60 is installed in the terminal 50.

Further, the above-described quarantine server 40 has a function which transmits a connection permission notification containing a VLAN tag (connection identifier) to the terminal 50 when the terminal 50 satisfies the policy, and gives an instruction to the bridge 30 to destroy the transmission information to which the VLAN tag is not given as the unrelated information among the transmission information transmitted from the terminal 50.

Thereby, it is possible to transmit a notification for encouraging the terminal in which the quarantine agent 60 is not installed to install the quarantine agent 60 and to prevent the terminal in which the quarantine agent is not installed from being connected to the operation network.

The above-described bridge 30 includes: a bridge control unit 31 which performs action controls of each structure of the bridge 30 and action controls of the entire bridge 30; and an information transfer unit 36 which transfers the information relayed to the bridge 30 to a transfer destination according to an action instruction of the bridge control unit 31.

The above-described information transfer unit 36 includes: a bridge setting database 33 in which the setting of the bridge 30 is stored; a MAC address table 34 in which pairs of the MAC address and the port number are stored; and a packet transfer unit 32 which transfers a received packet based on the bridge setting database 33 and the MAC address table 34. This is a typical bridge structure.

Further, the above-described bridge 30 includes an unrelated information destroying unit 35 which destroys the transmission information to which the VLAN tag is not given as the unrelated information among the transmission information transmitted from the terminal 50 based on the relay setting instruction transmitted from the quarantine server 40.

The above-described quarantine agent 60 is installed in the terminal 50. The quarantine agent 60 includes: a quarantine agent control unit 61 which performs entire controls including controls of each structure; a quarantine agent communication unit 66 which performs communication controls; and a VLAN tag setting DB 68 in which setting regarding handling of the VLAN tag is stored.

Here, an example of the setting content of the VLAN tag setting DB 68 is shown in FIG. 3D. In FIG. 3D, whether the type of the network to which the terminal 50 is connected is the quarantine network or the operation network is stored in "network type". The VLAN ID of the VLAN tag added to the transmission information by the quarantine agent 60 when the terminal 50 connected to the operation network transmits a packet is stored in "VLAN ID".

The above-described quarantine agent control unit 61 includes: a policy readout unit 62 which regularly requests, to the quarantine server 40, the policy required to be satisfied by the terminal 50 in order to connect to the operation network, and receives the policy transmitted from the quarantine server 40 in response to the request; a policy check unit 63 which judges whether or not the terminal 50 satisfies the policy received by the policy readout unit 62; and an existence notification unit 65 which notifies the quarantine server 40 that the quarantine agent 60 is installed in the terminal 50 when the terminal 50 is connected to the operation network.

The above-described policy check unit 63 includes a VLAN setting change unit 64 which updates the content of the VLAN tag setting DB 68 based on the result of judgment done by the policy check unit 63.

Thereby, the policy readout unit 62 regularly reads out the policy from the quarantine server 40, and the policy check unit 63 can judge whether or not the terminal 50 satisfies the policy read out by the policy readout unit 62.

The above-described quarantine agent communication unit 66 has a function which receives a packet with a VLAN tag and a packet without a VLAN tag, and includes a VLAN tag operation unit 67 which adds a VLAN tag to a transmission packet according to the content of the VLAN tag setting DB68 and transmits the packet when the terminal 50 is connected to the operation network and the transmission information (transmission packet) is transmitted from the terminal 50.

Thereby, the VLAN tag operation unit 67 can add the VLAN ID stored in the VLAN tag setting DB68 to the packet transmitted from the normal operation implementation unit 51 as the VLAN tag.

Further, since the bridge 30 has received an instruction from the quarantine sever 40 to destroy the transmission packet when the VLAN tag is not given to the packet transmitted from the terminal 50, the transmission packet from the terminal 50 can be destroyed by the bridge 30 when the quarantine agent 60 is uninstalled unlawfully from the terminal 50 and the transmission packet to which the VLAN tag is not given is transmitted from the terminal 50.

(Actions of Exemplary Embodiment)

Next, entire actions of the network quarantine system will be described by referring to FIG. 3 to FIG. 12.

Here, the VLAN ID of the quarantine network is defined as 10 (default VLAN), the content shown in FIG. 3A is stored in the VLAN setting DB44, and the VLAN ID of the operation network is defined as 20. Note that "port" shown in FIG. 3B shows the position of the physical port provided to the bridge 30. In the bridge 30, at least four physical ports are provided. In the followings, the four physical ports are referred to as the physical port 1, the physical port 2, the physical port 3, and the physical port 4 by corresponding to the positions thereof for convenience. Further, it is to be noted that a router is connected to the physical port 1 of the bridge 30, and the quarantine server 40 is connected to the physical port 2.

First, actions when the terminal 50 is connected anew to the physical port 3 of the bridge 30 for making an access to a Web server on the Internet and the quarantine agent 60 is installed will be described by referring to FIG. 4.

When the terminal 50 is connected to the bridge 30, it is connected to the quarantine network that is the default VLAN of the bridge 30 (FIG. 4: step S101/a quarantine network connecting step). FIG. 6A shows the setting of the bridge 30 at that time.

Regarding FIG. 6A, "port" shows the position of the physical port of the bridge 30, and "VLAN ID" shows the VLAN ID value of the physical port.

Further, "VLAN tag" is the setting regarding the VLAN tag when the bridge 30 transmits/receives a packet. When the setting value of "VLAN tag" is "Yes", the packet transmitted to the port has the VLAN tag added thereto is received while the packet without the VLAN tag is destroyed. Further, the VLAN tag is added when transmitting the packet.

In the meantime, when the setting value of "VLAN tag" is "No", the packet transmitted to the port without the VLAN tag is received while the packet having the VLAN tag added thereto is destroyed. Further, the VLAN tag is not added when transmitting the packet.

The above-described terminal 50 after being connected to the bridge 30 checks the MAC address of the router (default gateway) existing on the operation network in response to an ARP request (FIG. 4: step S102/an ARP request step). The ARP request is broadcasted, and a packet is delivered to the quarantine server 40.

The above-described quarantine server 40 returns an ARP response instead for the ARP request directed to the router (FIG. 4: step S103/an ARP response step). At this time, the router does not exist on the quarantine network, so that the router does not return the ARP response and the ARP response of the quarantine server 40 is necessarily delivered to the terminal 50. The terminal 50 upon receiving the ARP response recognizes the quarantine server 40 as the default gateway and performs communications thereafter.

Subsequently, the terminal 50 transmits a content transmission request (HTTP request) for the quarantine server 40 recognized as the default gateway as described above for making an access to the Web server on the Internet (FIG. 4: step S104/an HTTP request step).

The quarantine server 40 upon receiving the HTTP request responds to the Web content that gives an instruction to install the quarantine server 60 instead of the requested content (FIG. 4: step S105/an HTTP response step). The user installs the quarantine agent 60 to the terminal 50 according to the instruction of the quarantine server 40 (FIG. 4: step S106/an install step).

As described, when the quarantine server 40 receives the HTTP request from the terminal 50, it is possible to encourage the terminal 50 to install the quarantine agent 60 through transmitting the Web content that gives an instruction to install the quarantine agent 60 to the terminal 50 as a response to the HTTP request.

Next, actions executed when the quarantine agent 60 performs policy check of the terminal 50 and the terminal 50 is connected to the operation network will be described by referring to FIG. 5.

Figure 5:
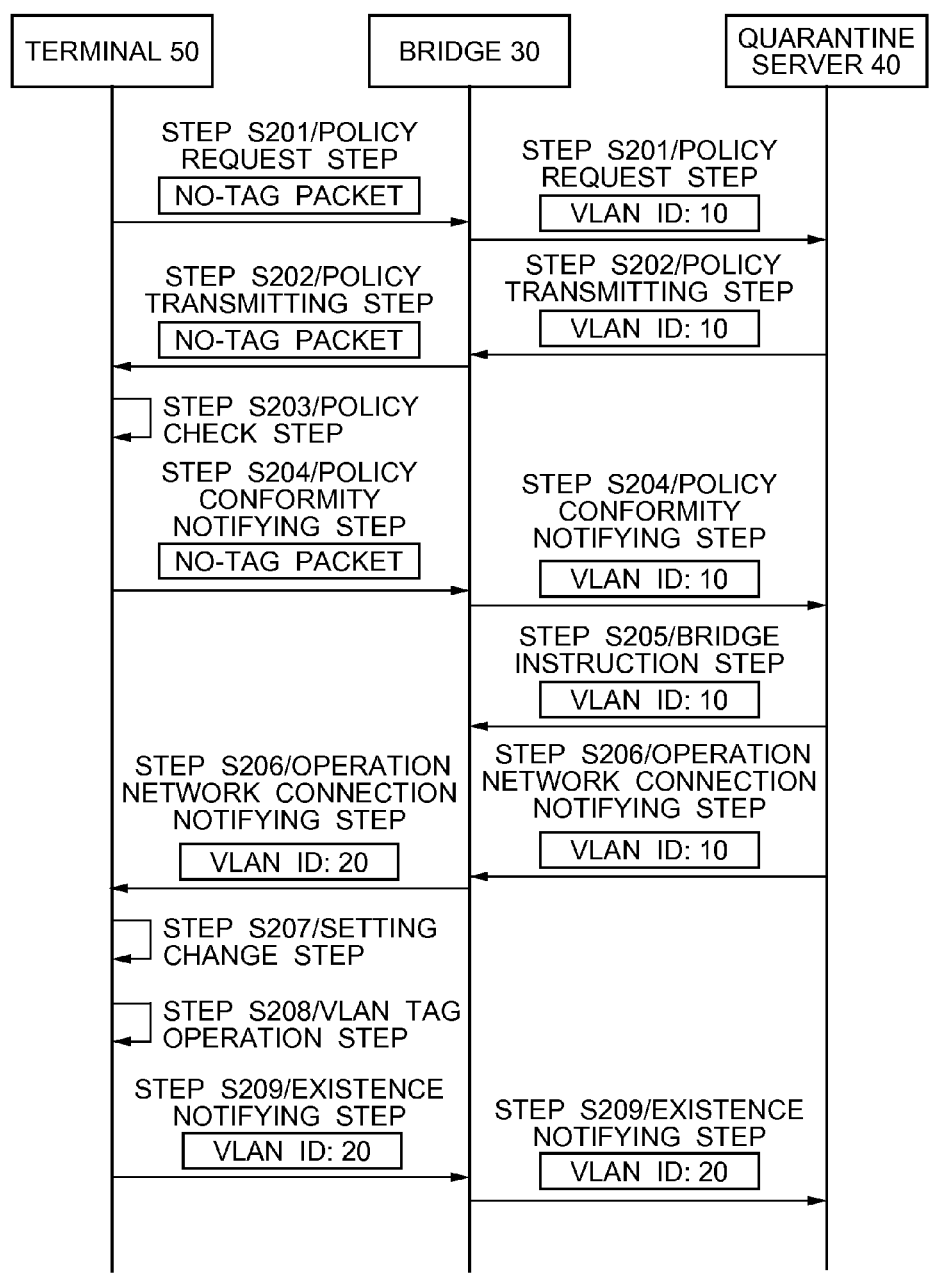
FIG. 5 is a sequence chart showing the flow of actions of the terminal 50, the bridge 30, and a quarantine server 40 when a quarantine agent 60 disclosed in FIG. 1 executes a policy check of the terminal 50, and the terminal 50 is connected to the operation network.

The quarantine agent 60 installed in the terminal 50 requests the quarantine server 40 to transmit the policy information that needs to be satisfied by the terminal 50 for being connected to the operation network 10 (FIG. 5: step S201/a policy request step).

The bridge 30 which relays the request for the policy information transmits a request for the policy information to the quarantine server 40 by adding the VLAN tag of the VLAN ID: 10 based on the own setting (FIG. 6A).

Upon receiving the policy request from the terminal 50, the quarantine server 40 adds a tag of the VLAN ID: 10 and transmits the policy to the terminal 50 (FIG. 5: step S202/a policy transmitting step). The bridge 30 transmits the policy to the terminal 50 without adding the VLAN tag based on the own setting (FIG. 6A).

The quarantine agent 60 upon receiving the policy from the quarantine server 40 checks whether or not the terminal 50 satisfies the received policy (FIG. 5: step S203/a policy check step). When checked that the policy is satisfied as a result of the check, the quarantine agent 60 transmits, to the quarantine server 40, a policy conformity notification showing that the terminal 50 conforms to the policy (FIG. 5: step S204/a policy conformity notifying step).

At that time, the bridge 30 upon receiving the policy conformity notification from the terminal 50 adds the VLAN tag of the VLAN ID: 10 to the policy conformity notification and transmits it to the quarantine server 40 based on the own setting (FIG. 6A) (FIG. 5: step S204/a policy conformity notifying step).

Subsequently, when the normal operation implementation unit 51 of the terminal 50 is judged to satisfy the policy by the quarantine agent 60, the quarantine server control unit 41 gives an instruction to the bridge 30 to destroy the information to which the VLAN tag as the connection identifier is not added as the unrelated information (FIG. 5: step S205/a relay device (bridge) instruction step).

Note here that the bridge 30 destroys the packet to which the VLAN tag is not added according to an instruction from the quarantine server control unit 40, when the packet to which the VLAN tag is not added is transmitted to the bridge 30 from the terminal 50.

As described above, upon receiving the policy conformity notification from the terminal 50, the quarantine server 40 sets the bridge 30 to change the VLAN allotment of the port connected to the terminal 50 to "operation network", and gives an instruction to transmit/receive only the packet to which the VLAN tag is added (FIG. 5: step S205/a relay device (bridge) instruction step).

Here, the content of the bridge setting database 33 changed by the quarantine server 40 is shown in FIG. 6B. As shown in the sections shown with broken lines in FIG. 6B, the quarantine server 40 changes the VLAN ID of the port 3 connected to the terminal 50 from "10" to "20", and changes the VLAN tag from "No" to "Yes".

Subsequently, the quarantine server control unit 41 transmits, to the terminal 50, a connection permission notification containing the connection identifier for the operation network 10 (FIG. 5: step S206/an operation network connection notifying step).

As described above, the quarantine server control unit 41 of the quarantine server 40 transmits a connection permission notification showing that the terminal 50 is in a state capable of being connected to the operation network 10 and the VLAN ID: 20 of the operation network 10 to the quarantine agent 60 after completing the setting change of the bridge 30 (FIG. 5: step S206/an operation network connection notifying step).

At that time, the bridge 30 transmits the connection permission notification and the VLAN ID transmitted from the quarantine server 40 to the terminal 50 by adding the VLAN tag of the VLAN ID: 20 based on the own setting (FIG. 6B).

The quarantine agent 60 of the terminal 50 changes the default gateway of the terminal 50 to the router based on the connection permission notification transmitted from the quarantine server 40, changes the "network type" of the VLAN tag setting DB68 shown in FIG. 3D from the quarantine network to the operation network, and changes the "VLAN ID" from 10 to 20 (FIG. 5: step S207/a setting change step). Thereby, connection of the terminal 50 to the operation network is completed.

With this, the VLAN tag operation 67 can add the VLAN ID: 20 to the transmission packet transmitted from the terminal 50 as the VLAN tag based on the content stored in the VLAN tag setting DB68.

Further, the VLAN tag operation unit 67 gives an instruction regarding an adding operation of the normal operation implementation unit 51 of the terminal 50 to add the connection identifier every time the transmission information is transmitted based on the connection permission notification transmitted from the quarantine server 40 (FIG. 5: step S208/a VLAN tag operation step).

Subsequently, in order to notify the quarantine server 40 that the quarantine agent 60 is installed in the terminal 50 after the terminal 50 is connected to the operation network, the quarantine agent 60 adds the VLAN tag of the VLAN ID: 20 changed in step S207 to an existence notification and transmits it to the quarantine server 40 at a prescribed interval set in advance (FIG. 5: step S209/an existence notifying step).

At that time, the bridge 30 transmits the existence notification transmitted from the terminal 50 to the quarantine server 40 based on the own setting shown in FIG. 6B.

Thereby, the terminal 50 becomes capable of being connected to the operation network 10 and capable of being connected to the Internet via the router. Further, the quarantine agent 60 can notify that the quarantine agent 60 is not canceled from the terminal 50 by transmitting the existence notification to the quarantine server 40 regularly.

Figure 7:
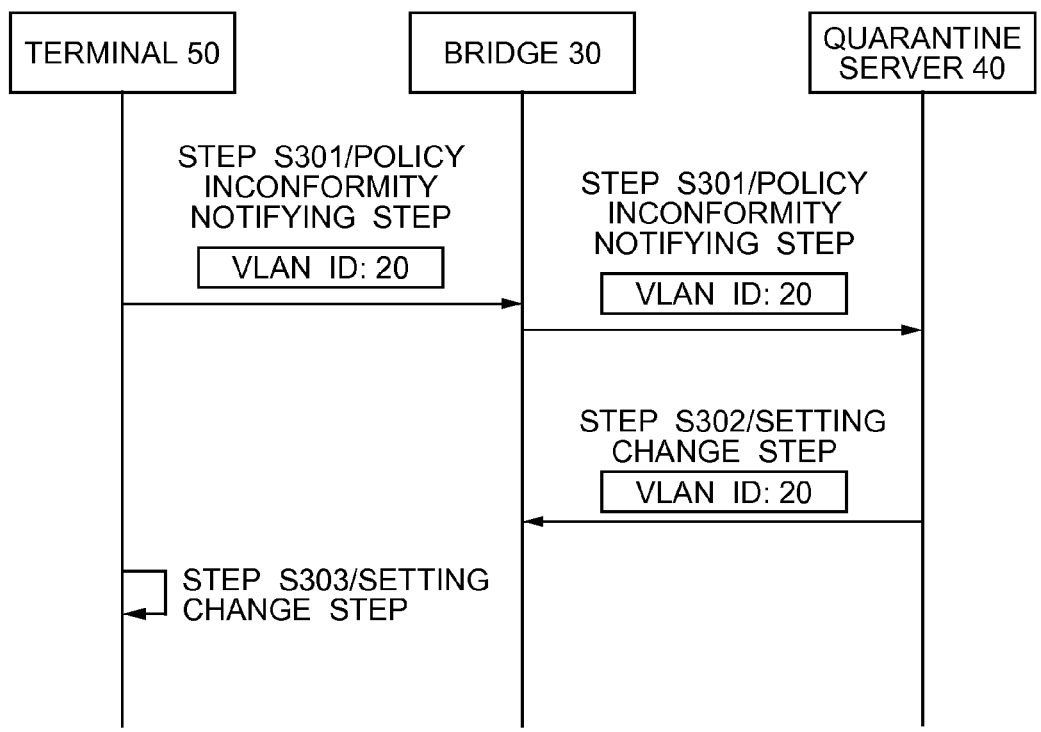
FIG. 7 is a sequence chart showing the flow of actions of the terminal 50, the bridge 30, and the quarantine server 40 in a case where the terminal 50 capable of being connected to the operation network has come to a state that does not satisfy the policy.

Next, described by referring to FIG. 7 are actions when the terminal 50 connected to the operation network comes not to satisfy the policy so that it is connected to the quarantine network.

When the terminal 50 comes to not to satisfy the policy, the quarantine agent 60 adds the VLAN tag of the VLAN ID: 20 to a policy inconformity notification showing that policy is not satisfied and transmits it to the quarantine server 40 (FIG. 7: step S301/a policy inconformity notifying step).

Further, the quarantine agent 60 changes the "network type" of the VLAN tag setting DB68 from the operation network to the quarantine network, and changes the default gateway from the router to the quarantine server 40 (FIG. 7: step S303/a setting change step).

This makes it possible for the VLAN tag operation unit 67 not to add the VLAN tag to the transmission packet every time the packet is transmitted from the terminal 50.

In the meantime, the bridge 30 adds the VLAN tag of the VLAN ID: 20 to the policy inconformity notification transmitted from the terminal 50 and transmits it to the quarantine server 40 based on the own setting (FIG. 6B).

The quarantine server 40 upon receiving the policy inconformity notification from the terminal 50 changes the "VLAN ID" of the port 3 of the bridge setting database 33 to "10" and changes the "VLAN tag" to "No" as shown in FIG. 6A (FIG. 7: step S302/a setting change step).

Through the above actions, the terminal 50 is isolated from the operation network and connected to the quarantine network. Thereby, the quarantine server 40 can return the setting of the bridge 30 to the setting at the time where the quarantine agent 60 is installed as shown in FIG. 6A.

Next, actions executed when the quarantine agent 60 is uninstalled under a state where the terminal 50 is connected to the operation network will be described by referring to FIG. 8. Note here that the setting of the bridge 30 at this time is as shown in FIG. 6B, and the VLAN tag setting DB68 is as shown in FIG. 3D.

When the quarantine agent 60 is uninstalled form the terminal 50 connected to the operation network, the packet transmitted from the terminal 50 thereafter is the packet to which the VLAN tag is not added. For example, it is assumed here that the terminal 50 transmits an HTTP request to the Web server on the Internet (FIG. 8: step S401/an HTTP request step). Regarding the setting of the bridge 30, the "VLAN tag" is "Yes" as shown in FIG. 6B, so that the packet to which the VLAN tag is not added is destroyed (FIG. 8: step S402/a packet destroying step).

Thus, the terminal 50 from which the quarantine agent 60 is uninstalled after being connected to the operation network cannot communicate with other information processing devices connected to the operation network. Further, since the quarantine agent 60 is uninstalled from the terminal 50, the existence check notification from the terminal 50 to the quarantine server 40 in step S403 is not transmitted, and the quarantine server 40 judges that the quarantine agent 60 is uninstalled from the terminal 50 after a prescribed time has passed.

Figure 8:
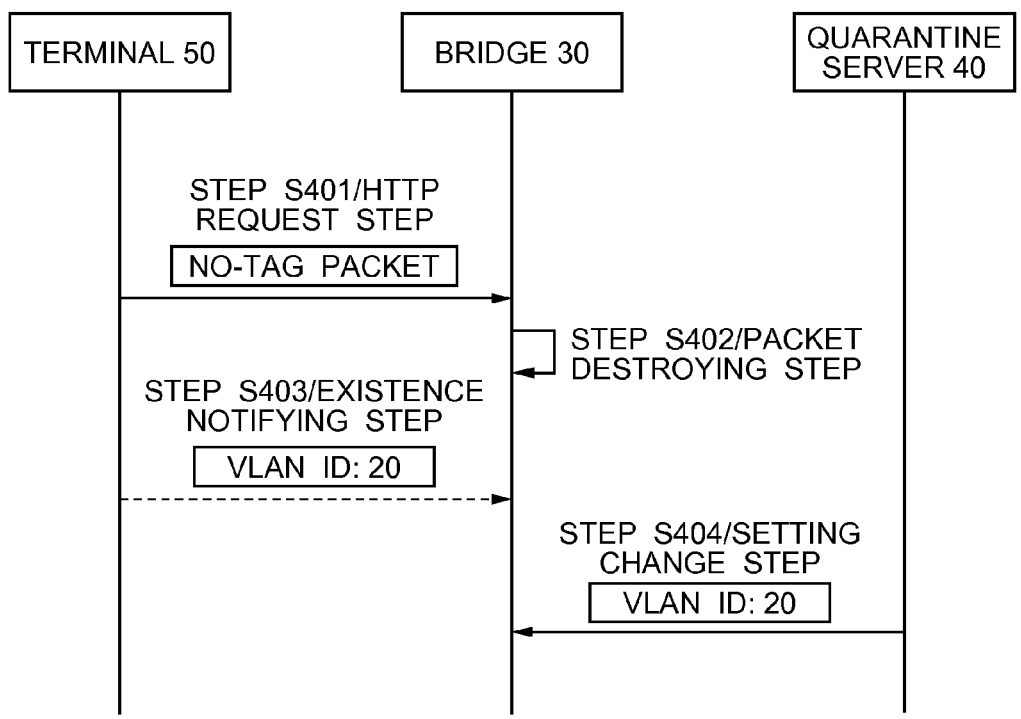
FIG. 8 is a sequence chart showing the flow of actions of the terminal 50, the bridge 30, and the quarantine server 40 in a case where the quarantine agent 60 is uninstalled from the terminal 50 in a state capable of being connected to the operation network.

Then, the quarantine server 40 changes the "VLAN ID" as the content stored in the bridge setting database 33 of the bridge 30 to "10" as shown in FIG. 6A, and changes the "VLAN tag" to "No" (FIG. 8: step S404/a setting change step).

Thereby, the terminal 50 in which the quarantine agent 60 is uninstalled is connected to the quarantine network and cannot be connected to the operation network.

With the above-described actions, when the quarantine agent 60 is uninstalled from the terminal 50 connected to the operation network, the terminal 50 from which the quarantine agent 60 is uninstalled immediately becomes impossible to communicate with other apparatuses and is not left being connected to the operation network.

Thereby, the terminal 50 in which the quarantine agent 60 is not installed becomes capable of communicating with the quarantine server 40 after the connection thereof is switched from the operation network to the quarantine network, so that the quarantine agent 60 can be reinstalled to the terminal 50 in which the quarantine agent is not installed. Therefore, it is possible to reconnect to the operation network by executing the install processing of the quarantine agent shown in FIG. 4.

Next, detailed actions of the quarantine agent control unit 61 when the quarantine agent 60 is installed in the terminal 50 will be described by referring to FIG. 9.

Figure 9:
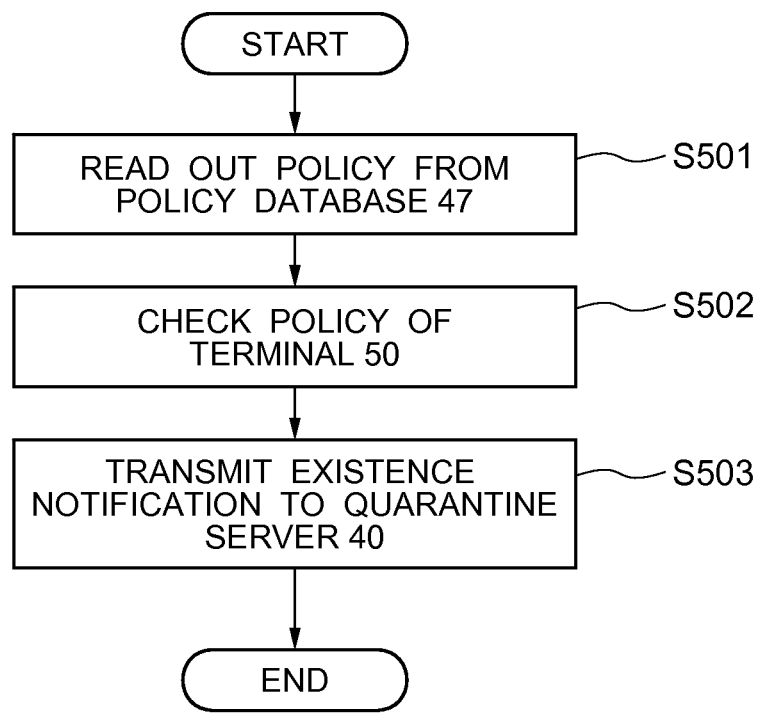
FIG. 9 is a flowchart showing actions of a quarantine agent control unit 61 disclosed in FIG. 1.

The quarantine agent control unit 61 gives an instruction to the policy readout unit 62 to read out the policy (FIG. 9: step S501/a policy readout step). The policy readout unit 62 requests the policy to the quarantine server 40 and reads out the policy according to the instruction from the quarantine agent control unit 61. After reading out the policy from the quarantine server 40, the policy readout unit 62 requests the policy to the quarantine server 40 repeatedly at time intervals determined in advance and reads out the policy from the quarantine server 40.

Then, the quarantine agent control unit 61 gives an instruction to the policy check unit 63 to execute a policy check (FIG. 9: step S502/a policy check step). After executing the policy check once, the policy check unit 63 sets a timer and repeatedly executes the policy check at time intervals determined in advance. The details of the policy check will be described later by referring to FIG. 10.

The quarantine agent control unit 61 at last gives an instruction to the existence notification unit 65 to execute the existence notification (FIG. 9: step S503/an existence notifying step). The existence notification unit 65 regularly notifies the quarantine server 40 of the existence through the quarantine agent communication unit 66 when the terminal 50 is connected to the operation network.

Figure 10:
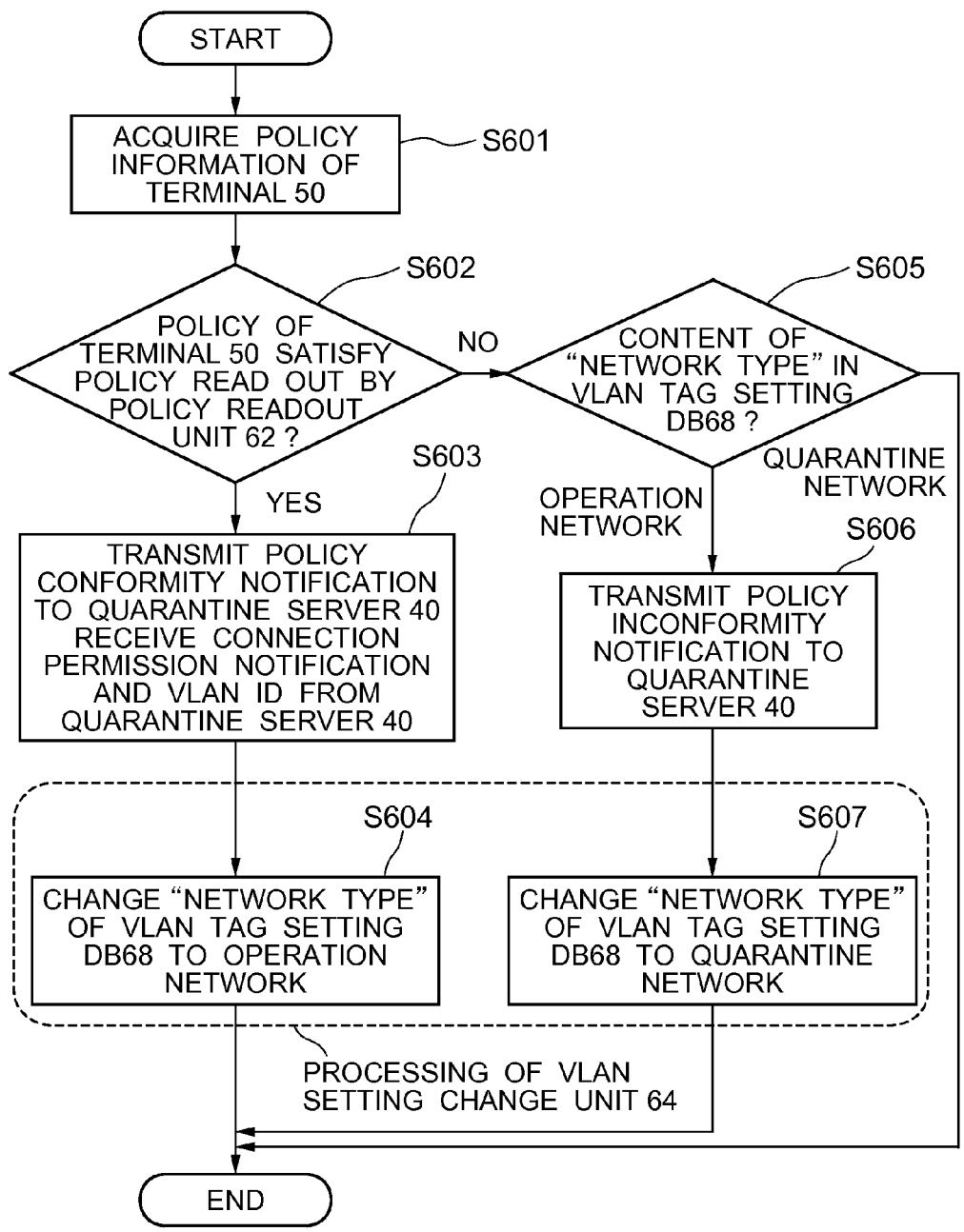
FIG. 10 is a flowchart showing actions of a policy check unit 62 disclosed in FIG. 1.

Subsequently, the policy check processing done by the policy check unit 63 is shown in FIG. 10. The policy check unit 63 collects various kinds of setting information of the terminal 50 based on the policy (FIG. 10: step S601/a terminal information collecting step). Here, examples of the information collected from the terminal 50 by the policy check unit 63 may be the information of the security patch of the OS, information of the pattern file of the installed antivirus software, and the like as shown in FIG. 3C.

When the collection of the various kinds of setting information of the terminal 50 ends, the policy check unit 63 judges whether or not terminal 50 conforms to the policy based on the collected information (FIG. 10: step S602/a policy conformity judging step).

When judged that the terminal 50 conforms to the policy (FIG. 10: Yes is step S602), the policy check unit 63 advances the processing to step S603. In step S603, the policy check unit 63 transmits a policy conformity notification showing that the terminal 50 conforms to the policy to the quarantine server 40 via the quarantine agent communication unit 66 (FIG. 10: step S603/a policy conformity notification transmitting step).

The policy check unit 63 receives an operation network connection notification and the VLAN ID of the operation network transmitted from the quarantine server 40 upon receiving the above-described policy conformity notification, and saves the received VLAN ID to the "VLAN ID" of the VLAN tag setting DB68.

Subsequently, the VLAN setting change unit 64 changes the "network type" of the VLAN tag setting DB68 from the quarantine network to the operation network, and ends the policy check (FIG. 10: step S604/a VLAN tag setting step).

In the meantime, when judged in step S602 described above that the terminal 50 does not conform to the policy (FIG. 10: No in step S602), the policy check unit 63 advances the processing to step S605. In step S605, the policy check unit 63 verifies the VLAN tag setting DB68, advances the processing to step S606 when the "network type" is the operation network, and ends the policy check when it is the quarantine network (FIG. 10: step S605/a network type verifying step).

In step S606 described above, the policy check unit 63 transmits, to the quarantine server 40, a policy inconformity notification showing that the terminal 50 does not conform to the policy through the quarantine agent communication unit 66 (FIG. 10: step S606/a policy inconformity notification transmitting step).

Subsequently, the VLAN setting change unit 64 changes the "network type" of the VLAN tag setting DB68 from the operation network to the quarantine network, and ends the policy check (FIG. 10: step S607/a no-VLAN tag setting step).

Next, the feature actions of the quarantine server control unit 41 will be described by referring to FIG. 11. The quarantine server control unit 41 waits to receive a packet from the quarantine server communication unit 45 (FIG. 11: step S701/a packet reception judging step).

Figure 11:
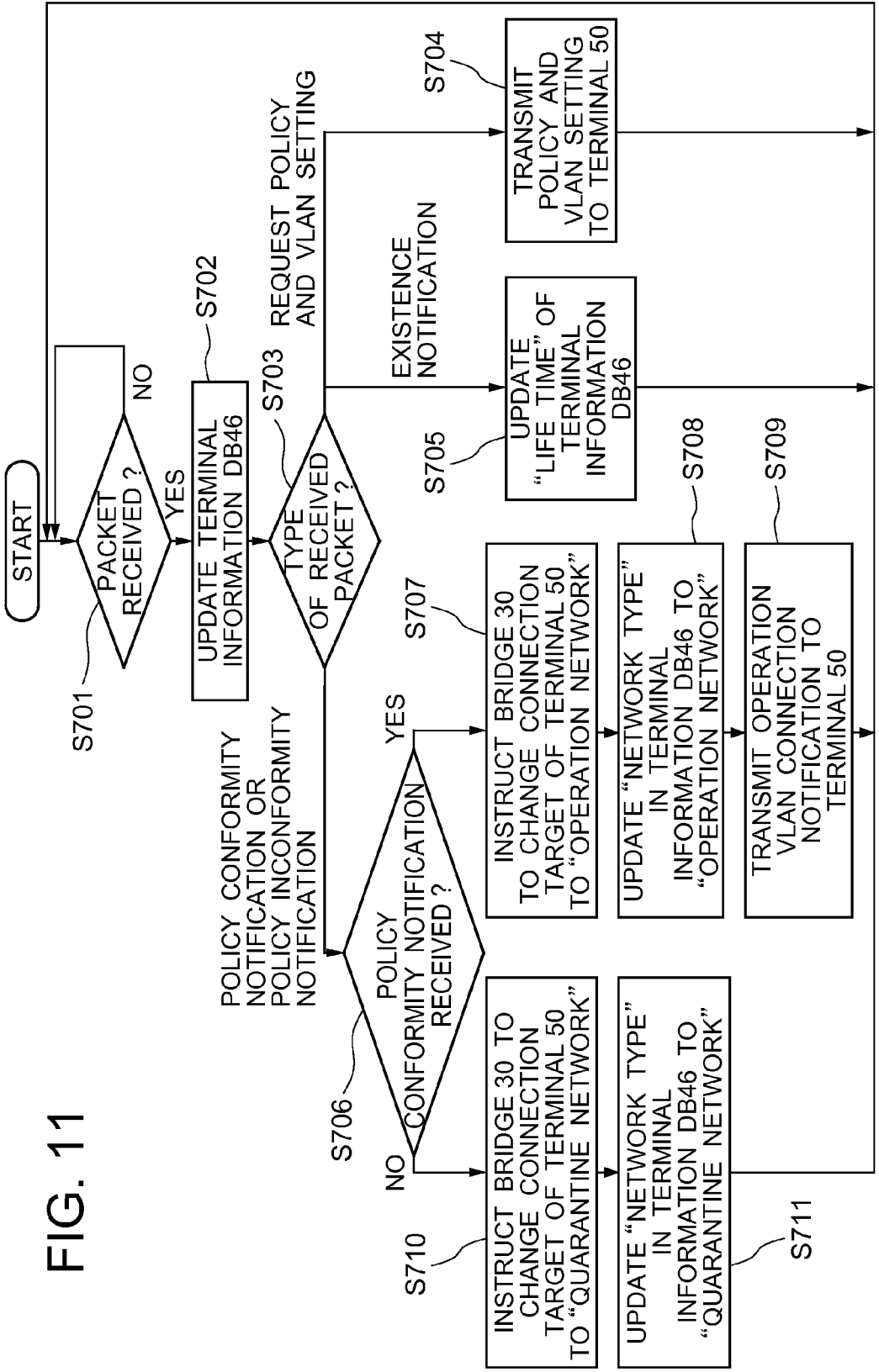
FIG. 11 is a flowchart showing actions of a quarantine server control unit 41 disclosed in FIG. 1.

Upon receiving the packet from the quarantine server communication unit 45, the quarantine server 40 updates the information of the terminal information DB46 (FIG. 11: step S702/a terminal information DB update step). The update method will be described later by referring to FIG. 12. The quarantine server control unit 41 discriminates the type of the received packet, and allots the processing (FIG. 11: step S703/a packet type discriminating step).

When a policy request is received from the quarantine agent 60 in step S703 described above, the quarantine server control unit 41 advances the processing to step S704. In step S704, the quarantine server control unit 41 reads out the policy from the policy DB47, and transmits the read out policy to the quarantine agent 60.

Further, when the existence notification is received in step S703, the quarantine server control unit 41 advances the processing to step S705. In step S705, based on a transmitter MAC address of the received packet, the quarantine server control unit 41 updates the "life time" of the terminal 50 having the MAC address recorded in the terminal information DB46 to data/time acquired by adding the connection permission time to the current time of the quarantine server 40.

The above-described connection permission time is a setting value stored in the quarantine server 40 in advance, which is the permission time for which connection to the operation network is permitted even when there is no existence notification transmitted from the quarantine agent 60 of the terminal 50 connected to the operation network.

Further, when the type of the received packet in step S703 described above is the policy conformity notification or the policy inconformity notification, the quarantine server control unit 41 advances the processing in step S706. In step S706, the quarantine server control unit 41 judges whether or not the received packet is the policy conformity notification.

When judged that the received packet is the policy conformity notification, the quarantine server control unit 41 advances the processing to step S707. In step S707, the quarantine server control unit 41 gives an instruction to the bridge setting change unit 42 to change the network to which the terminal 50 that is the transmitter of the policy conformity notification belongs from the quarantine network (VLAN ID: 10) to the operation network (VLAN ID: 20) (FIG. 11: step S707/a bridge setting change instruction step).

Upon receiving the instruction of the quarantine server control unit 41, the bridge setting change unit 42 changes the VLAN ID from 10 to 20 and the VLAN tag to "Yes" regarding the connected port of the terminal 50 as the transmitter of the policy conformity notification among the setting of the bridge 30.

Further, the quarantine server control unit 41 changes the "network type" of the entry corresponding to the terminal information DB46 to the operation network (FIG. 11: step S708/a terminal information DB update step) and, at the same time, transmits the operation network connection notification and the VLAN ID of the operation network to the terminal 50 that is the transmitter of the policy conformity notification (FIG. 11: step S709/an operation VLAN connection notifying step).

Here, when judged in step S706 described above that the type of the received packet is the policy inconformity notification, the quarantine server control unit 41 advances the processing to step S710. In step S710, the quarantine server control unit 41 gives an instruction to the bridge setting change unit 42 to change the network to which the terminal 50 that is the transmitter of the policy inconformity notification from the operation network (VLAN ID: 20) to the quarantine network (VLAN ID: 10) (FIG. 11: step S710/a bridge setting change instruction step).

Upon receiving the instruction of the quarantine server control unit 41, the bridge setting change unit 42 changes the VLAN ID from 20 to 10 and the VLAN tag to "No" regarding the connected port of the terminal 50 as the transmitter of the policy conformity notification among the setting of the bridge 30. The quarantine server control unit 41 updates the "network type" of the entry corresponding to the terminal information DB46 to the quarantine network and the "life time" to "-" (FIG. 11: step S711/a terminal information DB update step).

Figure 12:
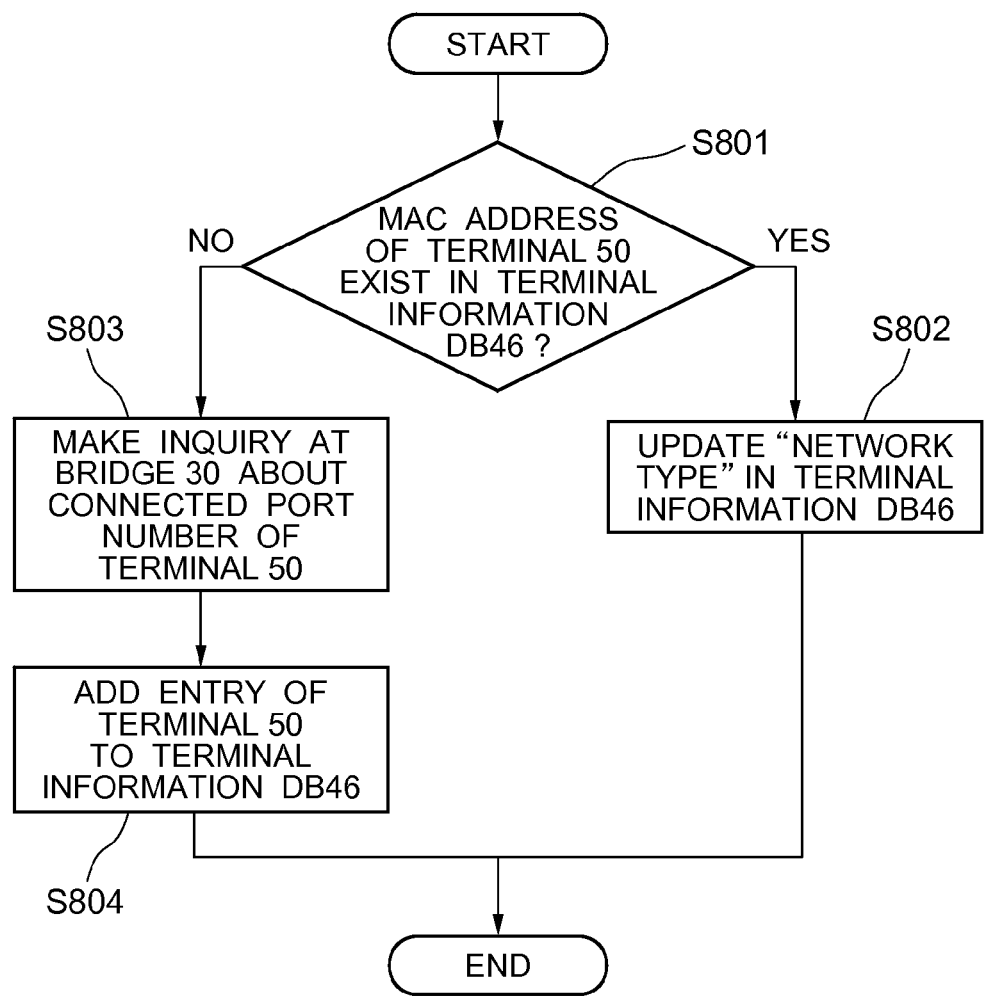
FIG. 12 is flowchart showing update processing of a terminal information DB46 disclosed in FIG. 1.

Here, the update method of the above-described terminal information DB46 will be described by referring to FIG. 12. The quarantine server control unit 41 verifies whether or not the transmitter MAC address of the received packet is registered in the terminal information DB46 (FIG. 12: step S801/a terminal information DB verifying step).

When the transmitter MAC address is registered in the terminal information DB46 by the quarantine server control unit 41, the quarantine server control unit 41 advances the processing to step S802. In step S802, the quarantine server 41 searches the VLAN ID of the received packet from the VLAN information DB44, check the network type, and updates the network type based on the MAC address in the terminal information DB46.

Further, when verified in step S801 that the MAC address is not registered in the terminal information DB46, the quarantine server control unit 41 advances the processing to step S803. In step S803, the quarantine server control unit 41 refers to a MAC address table 34 of the bridge 30 for checking to which port of the bridge 30 the terminal 50 having the MAC address is connected. In step S804, the quarantine server control unit 41 adds "port", "MAC address", "network type", and "life time (the value is -)" to the terminal information DB46.

Figure 13:
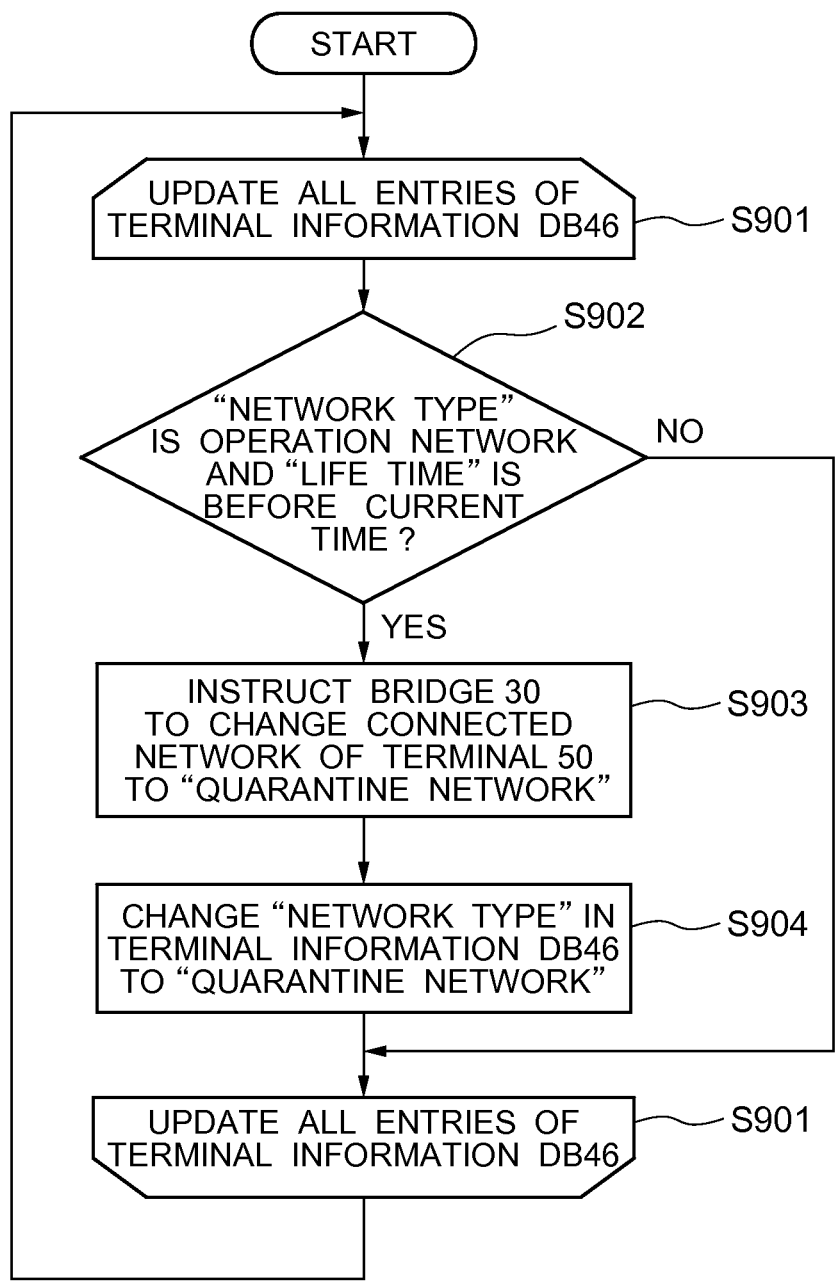
FIG. 13 is a flowchart showing processing of a quarantine agent install verification unit 43 disclosed in FIG. 1.

Next, actions of the quarantine agent install verification unit 43 will be described by referring to FIG. 13. The quarantine agent install verification unit 43 executes processing of step S902 and thereafter for all the entries of the terminal information DB46 (FIG. 13: step S901/a terminal information DB update step).

Here, when the "network type" of the terminal information DB46 is the operation network and the "life time" is before the current time of the quarantine server 40 in step S902, the quarantine agent install verification unit 43 advances the processing to step S903. In a case where this condition is not satisfied, the quarantine agent install verification unit 43 advances the processing to the next entry.

In step S903 described above, the quarantine agent install verification unit 43 gives an instruction to the bridge setting change unit 42 to change the connected network from the operation network (VLAN ID: 20) to the quarantine network (VLAN ID: 10) for the terminal 50 written in the entry of the processing target.

Upon receiving the instruction of the quarantine agent install verification unit 43, the bridge setting change unit 42 changes the VLAN ID from 20 to 10 and the VLAN tag to "No" regarding the connected port of the terminal 50 written in the entry of the processing target among the setting of the bridge 30. Further, the bridge setting change unit 42 updates the "network type" of the entry corresponding to the terminal information DB46 to the quarantine network and the "life time" to "-".

Thereby, when a terminal is connected anew to the bridge 30 and connected to the quarantine server 40 for the HTTP request, that terminal cannot connect to the operation network unless the terminal is connected to the quarantine network, installs the quarantine agent 60, and satisfies the policy. Therefore, the security of the operation network can be ensured.

Note here that each execution content executed in the quarantine network connecting step, the ARP request step, the HTTP request step, the install step, the policy request step, the policy check step, the policy conformity notifying step, the setting change step, the existence notifying step, the policy inconformity notifying step, the policy readout step, the terminal information collecting step, the policy conformity judging step, the policy conformity notification transmitting step, the VLAN tag operation step, the VLAN tag setting step, the network type verifying step, the policy inconformity notification transmitting step, the no-VLAN tag setting step as the actions of the above-described exemplary embodiment may be put into a program to have it executed by a computer that is provided in advance to the terminal 50.

Further, each execution content executed in the ARP response step, the HTTP response step, the policy transmitting step, the operation network connection notifying step, the setting change step, the bridge instruction step, the packet reception judging step, the packet type judging step, the operation VLAN connection notifying step, the bridge setting change instruction step, the terminal information DB verifying step, and the terminal information DB update step as the actions of the above-described exemplary embodiment may be put into a program to have it executed by a computer provided in advance to the quarantine server.

In such cases, the program may be recorded on a non-transitory recording medium such as a DVD, a CD, a flash memory, or the like. In that case, the program is read out from the recording medium and executed by the computer.

(Effects of Exemplary Embodiment)

As described above, when the policy readout unit 62 reads out the policy from the policy DB47 of the quarantine server 40, the policy check unit 63 judges whether or not the terminal 50 satisfies the read out policy, and judged that the policy is satisfied, the quarantine agent control unit 61 transmits a policy conformity notification to the quarantine server 40. Upon receiving the policy conformity notification, the quarantine server 40 gives an instruction to the bridge 30 to destroy the transmission packet to which the VLAN tag is not added among the transmission packets from the terminal 50 and transmits a connection permission notification containing the VLAN tag to the terminal 50. The VLAN tag operation unit 67 adds the VLAN tag to the packet transmitted from the terminal 50, and the bridge 30 accepts only the packet to which the VLAN tag is added from the terminal 50. Thereby, when the quarantine agent 60 is unlawfully uninstalled from the terminal 50, the transmission packet from the terminal 50 does not have the VLAN tag added thereto. Thus, the transmission packet is destroyed by the bridge 30, and the terminal 50 can be immediately blocked from the operation network 10.

Regarding the embodiment described above, the new technical contents of the above-described embodiment can be summarized as in following Supplementary Notes.

While a part of or a whole part of the embodiment can be summarized as follows as the new techniques, the present invention is not necessarily limited only to the followings.

(Supplementary Note 1)

A network quarantine system which includes:
a quarantine agent mounted to a terminal having a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, wherein:
the quarantine server includes a quarantine server control unit which functions when judged by the quarantine agent that the normal operation implementation unit of the terminal satisfies the policy to transmit a connection permission notification containing a connection identifier for the operation network to the terminal and gives an instruction to the relay device to destroy information to which the connection identifier is not added as unrelated information; and
the quarantine agent of the terminal includes a VLAN tag operation unit which gives an instruction regarding an adding action of the normal operation implementation unit of the terminal to add the connection identifier every time when transmitting transmission information based on the connection permission notification transmitted from the quarantine server.

(Supplementary Note 2)

The network quarantine system as depicted in Supplementary Note 1, wherein
the quarantine server control unit includes a function which accepts input of the policy from outside in advance, and a policy database for storing the policy inputted from the outside is provided to the quarantine server control unit.

(Supplementary Note 3)

The network quarantine system as depicted in Supplementary Note 2, wherein
the quarantine agent of the terminal reads out the policy from the policy database when judging the policy, and a policy check unit provided in advance to the quarantine agent judges whether or not the normal operation implementation unit satisfies the read out policy.

(Supplementary Note 4)

The network quarantine system as depicted in Supplementary Note 3, wherein
the quarantine agent of the terminal includes an existence notification unit which transmits an existence notification showing that the quarantine agent exists in the terminal to the quarantine server, when judged by the policy check unit that the policy is satisfied.

(Supplementary Note 5)

The network quarantine system as depicted in Supplementary Note 4, wherein:
the quarantine server includes a terminal information database which stores time acquired by adding connection permission time set in advance to data/time at which the existence notification transmitted from the existence notification unit of the terminal is received most recently as life time of the terminal;
the quarantine server control unit includes a life time determination unit which judges whether or not it has reached the life time, and a data destruction instruction unit which instructs the relay device to destroy the transmission information transmitted from the terminal as the unrelated information when judged by the life time determination unit that it has reached the life time; and
the relay device includes an unrelated information destroying unit which destroys the transmission information transmitted from the terminal as the unrelated information upon receiving the instruction from the data destruction instruction unit.

(Supplementary Note 6)

A network quarantine method used in a network quarantine system which includes: a quarantine agent mounted to a terminal having a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, wherein:
when judged by the quarantine agent that a normal operation implementation unit of the terminal satisfies the policy, a quarantine server control unit gives an instruction to the relay device to destroy information to which the connection identifier is not added as unrelated information;
the quarantine server control unit transmits a connection permission notification containing a connection identifier for the operation network to the terminal; and
a VLAN tag operation unit gives an instruction regarding an adding action of the normal operation implementation unit of the terminal to add the connection identifier every time when transmitting transmission information based on the connection permission notification transmitted from the quarantine server.

(Supplementary Note 7)

A network quarantine program used in a network quarantine system which includes: a quarantine agent mounted to a terminal having a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, the program causing a computer provided in advance to the quarantine server to execute:

a relay device instruction function which, when judged by the quarantine agent that the normal operation implementation unit of the terminal satisfies the policy, transmits a connection permission notification containing a connection identifier for the operation network to the terminal and gives an instruction to the relay device to destroy information to which the connection identifier is not added as unrelated information.

(Supplementary Note 8)

A network quarantine program used in a network quarantine system which includes: a quarantine agent mounted to a terminal including a normal operation implementation unit that performs operation processing by using an operation network, which judges whether or not the normal operation implementation unit satisfies a policy that is a security basis restricted in advance in the operation network; a relay device connected between the terminal and the operation network, which allows the terminal to connect to the operation network based on a result of judgment when the quarantine agent judges that the terminal satisfies the policy; and a quarantine server which controls actions of the relay device, the program causing a computer provided in advance to the terminal to execute:

a VLAN tag operation function which gives an instruction regarding an adding action of the normal operation implementation unit of the terminal to add the connection identifier every time when transmitting transmission information based on the connection permission notification transmitted from the quarantine server.

This application claims the Priority right based on Japanese Patent Application No. 2011-152469 filed on Jul. 11, 2011 and the disclosure thereof is hereby incorporated by reference in its entirety.

INDUSTRIAL APPLICABILITY

The present invention can be applied to a system in which terminals are connected to a network where the security is ensured for performing operation processing, such a network of business corporations, universities, etc.

REFERENCE NUMERALS

10 Operation network
30 Bridge (relay device)
35 Unrelated information destroying unit
36 Information transfer unit
40 Quarantine server
41 Quarantine server control unit
46 Terminal information database (terminal information DB)
47 Policy database (policy DB)
48 Life time determination unit
49 Data destruction instruction unit
50 Terminal
51 Normal operation implementation unit
60 Quarantine agent
61 Quarantine agent control unit
62 Policy readout unit
63 Policy check unit
65 Existence notification unit
67 VLAN tag operation unit

What is claimed is:

1. A network quarantine system, comprising:
a quarantine agent mounted to a terminal comprising a normal operation implementation unit that performs operation processing by using an operation network, which judges whether or not the normal operation implementation unit satisfies a policy that is a security basis restricted in advance in the operation network;
a relay device connected between the terminal and the operation network, which allows the terminal to connect to the operation network based on a result of judgment when the quarantine agent judges that the terminal satisfies the policy; and
a quarantine server which controls actions of the relay device, wherein:
the quarantine server comprises a quarantine server control unit which functions when judged by the quarantine agent that the normal operation implementation unit of the terminal satisfies the policy to transmit a connection permission notification containing a connection identifier for the operation network to the terminal and gives an instruction to the relay device to destroy information to which the connection identifier is not added as unrelated information;
the quarantine agent of the terminal comprises a VLAN tag operation unit which gives an instruction regarding an adding action of the normal operation implementation unit of the terminal to add the connection identifier every time when transmitting transmission information based on the connection permission notification transmitted from the quarantine server; and
the relay device and the quarantine server cooperate to destroy the information and immediately block the terminal from the operation network without keeping the terminal in a state of being connected to the operation network, even when the terminal is judged to satisfy the policy by the quarantine agent and is connected to the operation network, and then the quarantine agent is uninstalled in an unauthorized manner.

2. The network quarantine system as claimed in claim 1, wherein
the quarantine server control unit includes a function which accepts input of the policy from outside in advance, and a policy database for storing the policy inputted from the outside is provided to the quarantine server control unit.

3. The network quarantine system as claimed in claim 2, wherein
the quarantine agent of the terminal reads out the policy from the policy database when judging the policy, and a policy check unit provided in advance to the quarantine agent judges whether or not the normal operation implementation unit satisfies the read out policy.

4. The network quarantine system as claimed in claim 3, wherein
the quarantine agent of the terminal comprises an existence notification unit which transmits an existence notification showing that the quarantine agent exists in the terminal to the quarantine server, when judged by the policy check unit that the policy is satisfied.

5. The network quarantine system as claimed in claim 4, wherein:
the quarantine server comprises a terminal information database which stores time acquired by adding connection permission time set in advance to data/time at which the existence notification transmitted from the existence notification unit of the terminal is received most recently as life time of the terminal;
the quarantine server control unit comprises a life time determination unit which judges whether or not it has reached the life time, and a data destruction instruction unit which instructs the relay device to destroy the transmission information transmitted from the terminal as the unrelated information when judged by the life time determination unit that it has reached the life time; and
the relay device comprises an unrelated information destroying unit which destroys the transmission information transmitted from the terminal as the unrelated information upon receiving the instruction from the data destruction instruction unit.

6. A network quarantine method used in a network quarantine system which comprises: a quarantine agent mounted to a terminal comprising a normal operation implementation unit that performs operation processing by using an operation network, which judges whether or not the normal operation implementation unit satisfies a policy that is a security basis restricted in advance in the operation network;
a relay device connected between the terminal and the operation network, which allows the terminal to connect to the operation network based on a result of judgment when the quarantine agent judges that the terminal satisfies the policy; and
a quarantine server which controls actions of the relay device, wherein:
when judged by the quarantine agent that a normal operation implementation unit of the terminal satisfies the policy, a quarantine server control unit gives an instruction to the relay device to destroy information to which the connection identifier is not added as unrelated information;
the quarantine server control unit transmits a connection permission notification containing a connection identifier for the operation network to the terminal;
a VLAN tag operation unit gives an instruction regarding an adding action of the normal operation implementation unit of the terminal to add the connection identifier every time when transmitting transmission information based on the connection permission notification transmitted from the quarantine server; and
the relay device and the quarantine server cooperate to destroy the information and immediately block the terminal from the operation network without keeping the terminal in a state of being connected to the operation network, even when the terminal is judged to satisfy the policy by the quarantine agent and is connected to the operation network, and then the quarantine agent is uninstalled in an unauthorized manner.

7. A non-transitory computer readable recording medium storing a network quarantine program used in a network quarantine system which comprises:
a quarantine agent mounted to a terminal comprising a normal operation implementation unit that performs operation processing by using an operation network, which judges whether or not the normal operation implementation unit satisfies a policy that is a security basis restricted in advance in the operation network;
a relay device connected between the terminal and the operation network, which allows the terminal to connect to the operation network based on a result of judgment when the quarantine agent judges that the terminal satisfies the policy; and
a quarantine server which controls actions of the relay device, the program causing a computer provided in advance to the quarantine server to execute:
a relay device instruction function which, when judged by the quarantine agent that the normal operation implementation unit of the terminal satisfies the policy, transmits a connection permission notification containing a connection identifier for the operation network to the terminal and gives an instruction to the relay device to destroy information to which the connection identifier is not added as unrelated information, and
the relay device and the quarantine server cooperate to destroy the information and immediately block the terminal from the operation network without keeping the terminal in a state of being connected to the operation network even when the terminal is judged to satisfy the policy by the quarantine agent and is connected to the operation network, and then the quarantine agent is uninstalled in an unauthorized manner.

8. A non-transitory computer readable recording medium storing a network quarantine program used in a network quarantine system which comprises:
a quarantine agent mounted to a terminal comprising a normal operation implementation unit that performs operation processing by using an operation network, which judges whether or not the normal operation implementation unit satisfies a policy that is a security basis restricted in advance in the operation network;
a relay device connected between the terminal and the operation network, which allows the terminal to connect to the operation network based on a result of judgment when the quarantine agent judges that the terminal satisfies the policy; and
a quarantine server which controls actions of the relay device, the program causing a computer provided in advance to the terminal to execute:
a VLAN tag operation function which gives an instruction regarding an adding action of the normal operation implementation unit of the terminal to add the connection identifier every time when transmitting transmission information based on the connection permission notification transmitted from the quarantine server; wherein:
the relay device and the quarantine server cooperate to destroy the information and immediately block the terminal from the operation network without keeping the terminal in a state of being connected to the operation network, even when the terminal is judged to satisfy the policy by the quarantine agent and is connected to the operation network, and then the quarantine agent is uninstalled in an unauthorized manner.

9. A network quarantine system, comprising:
a quarantine agent mounted to a terminal comprising a normal operation implementation unit that performs operation processing by using an operation network, for judging whether or not the normal operation implementation unit satisfies a policy that is a security basis restricted in advance in the operation network;
relay means connected between the terminal and the operation network, for allowing the terminal to connect to the operation network based on a result of judgment when the quarantine agent judges that the terminal satisfies the policy; and a quarantine server for controlling actions of the relay device, wherein:

the quarantine server comprises a quarantine server control means for functioning when judged by the quarantine agent that the normal operation implementation unit of the terminal satisfies the policy to transmit a connection permission notification containing a connection identifier for the operation network to the terminal and giving an instruction to the relay means to destroy information to which the connection identifier is not added as unrelated information;

the quarantine agent of the terminal comprises VLAN tag operation means for giving an instruction regarding an adding action of the normal operation implementation unit of the terminal to add the connection identifier every time when transmitting transmission information based on the connection permission notification transmitted from the quarantine server; and the relay means and the quarantine server cooperate to destroy the information and immediately block the terminal from the operation network without keeping the terminal in a state of being connected to the operation network, even when the terminal is judged to satisfy the policy by the quarantine agent and is connected to the operation network, and then the quarantine agent is uninstalled in an unauthorized manner.

* * * * *